United States Patent
Lamer et al.

(10) Patent No.: US 7,110,896 B2
(45) Date of Patent: Sep. 19, 2006

(54) SYSTEM AND METHOD FOR DISPLAYING BATTERY STATUS AND OTHER PARAMETERS OF A PORTABLE ELECTRONIC DEVICE IN A POWER-OFF STATE

(75) Inventors: Joel Bennett Lamer, Fort Collins, CO (US); Mark John Bianchi, Fort Collins, CO (US); Amy E. Battles, Windsor, CO (US); Lisa Marie Tucker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 10/420,678

(22) Filed: Apr. 22, 2003

(65) Prior Publication Data

US 2004/0215408 A1    Oct. 28, 2004

(51) Int. Cl.
*G01R 31/36*    (2006.01)
(52) U.S. Cl. ............... 702/63; 320/132; 340/363.1
(58) Field of Classification Search ............. 702/63; 320/132, 136; 340/636.1, 636.11, 636.12, 340/636.13, 636.14, 636.15, 636.16, 636.17, 340/636.18, 636.19; 396/279
See application file for complete search history.

(56) References Cited

U.S. PATENT DOCUMENTS

| | | | |
|---|---|---|---|
| 4,638,237 A * | 1/1987 | Fernandez | 340/636.1 |
| 4,716,433 A | 12/1987 | Alyfuku | |
| 4,751,545 A | 6/1988 | Iguchi | |
| 4,855,781 A | 8/1989 | Hoshino | |
| 4,866,471 A | 9/1989 | Ikuta | |
| 5,041,860 A | 8/1991 | Kobayashi et al. | |
| 5,528,335 A | 6/1996 | Terunuma | |
| 5,625,274 A * | 4/1997 | Naskali | 320/149 |
| 5,713,050 A | 1/1998 | Ozawa | |
| 5,721,987 A | 2/1998 | Ozawa | |
| 5,732,295 A | 3/1998 | Seki et al. | |
| 5,799,217 A | 8/1998 | Saegusa et al. | |
| 5,870,025 A * | 2/1999 | Hinohara | 340/636.12 |
| 6,031,999 A | 2/2000 | Ogawa | |
| 6,064,183 A | 5/2000 | Akizuki et al. | |
| 6,078,871 A | 6/2000 | Anderson | |
| 6,091,909 A | 7/2000 | McIntyre et al. | |
| 6,169,387 B1 | 1/2001 | Kaib | |
| 6,236,189 B1 | 5/2001 | Franke | |
| 6,339,264 B1 | 1/2002 | Wang | |
| 6,469,474 B1 * | 10/2002 | Bunker | 320/132 |

* cited by examiner

*Primary Examiner*—Michael Nghiem
*Assistant Examiner*—Stephen J. Cherry

(57) ABSTRACT

A system and method quickly and effectively display battery status and/or other parameters of a portable electronic device. In one embodiment, a method displays parameters of a portable electronic device in a power-off state by storing a plurality of user-definable settings in response to a power-off condition. In addition, the method detects an activation of a status input, and in response applies power to a display, and displays a status of the stored parameters on a display, while maintaining operational logic of the personal electronic device in a power-off state. In another embodiment, a method displays a current battery-power status of a portable electronic device, while in a power-off state. This method retrieves a battery-power status that was previously measured and saved. Using this retrieved information, along with a measured amount of time since the information was measured or saved, method determines the current battery-power status.

13 Claims, 5 Drawing Sheets

SYSTEM AND METHOD FOR DISPLAYING BATTERY STATUS AND OTHER PARAMETERS OF A PORTABLE ELECTRONIC DEVICE IN A POWER-OFF STATE

BACKGROUND OF THE INVENTION

1. Field of the Invention

The present invention relates to portable electronic devices and, more particularly, to a system and method for displaying battery status and other parameters of a portable electronic device in a power-off state.

2. Discussion of the Related Art

There are a wide variety of portable electronic devices that are operated by battery power and have some sort of visual display, such as a liquid crystal display (LCD), for displaying information to a user. In addition to substantive or operational information, many portable electronic devices may display certain configuration information, such as operational or control settings. Digital cameras are one example of portable electronic devices that have a display for displaying information (in addition to picture or field-of-view information) to a user. During operation, the camera may display a variety of configuration information to the user, such as the number of pictures in memory, the shutter setting, the remaining battery life, and a variety of other settings which may be of interest to the user.

As is known, this information is displayed when a portable electronic device is in an operational mode. Thus, when the device is powered off, for example, this configuration and other information is not displayable to the user. In fact, when the portable electronic device is in a power-off state, typically no power is applied to the display (to maximize the conservation of power and therefore battery life), and therefore nothing is displayed on the display. Further, many portable electronic devices require undesirably long period of time to cycle through start routines (after the device is turned on). Thus, when users desire to know the expected battery life or other parameters of a device that is currently powered off, there is typically an undesirably long waiting period before that information can be displayed.

In the specific situation of a user desiring to obtain information about battery life when the device is powered down, the start-up cycle typically includes a period of time in which the battery-power status is determined. As is know, this determination typically involves placing a load on the battery and measuring the current and/or voltage response to the load.

Accordingly, there is a desire to provide a portable electronic device with the ability to display this information to a user rapidly, even when in a power-off condition.

SUMMARY OF THE INVENTION

Accordingly, it is desired to provide a system and method that quickly and effectively display battery status and/or other parameters of a portable electronic device, even when the device is in a power-off state. In one embodiment, a method displays parameters of a portable electronic device in a power-off state by storing a plurality of user-definable settings in response to a power-off condition. In addition, the method detects an activation of a status input, and in response applies power to a display, and displays a status of the stored parameters on a display, while maintaining operational logic of the personal electronic device in a power-off state.

Another embodiment of the invention is directed a method for displaying a current battery-power status of a portable electronic device, while in a power-off state. This method retrieves a battery-power status that was previously measured and saved, and determines an amount of time passage since the power-off condition. The method also determines an amount of decay in the battery power level since the battery-power status was measured or saved, the amount of decay being dependent on the determined amount of time passage. Finally, the method determines the current battery-power status, the current battery-power status being dependent on the retrieved battery-power status and the determined decay, and displays the current battery-power status. Consistent with the invention, other parameters (in addition to the battery status) may be displayed as well.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

As summarized above, an embodiment of the present invention is directed to a method and apparatus for a portable electronic-device for displaying parameters (e.g., battery-power status, configuration settings, etc.) of the device, while the device is in a power-off state. It should be appreciated that, consistent with the scope and spirit of the present invention, the portable electronic device can be any of a wide variety of devices, including digital cameras, video cameras, personal digital assistants (PDAs), cellular phones, etc. In an embodiment, the parameters are displayed in response to the activation of a manual input (e.g., by depressing a button).

Figure 1:
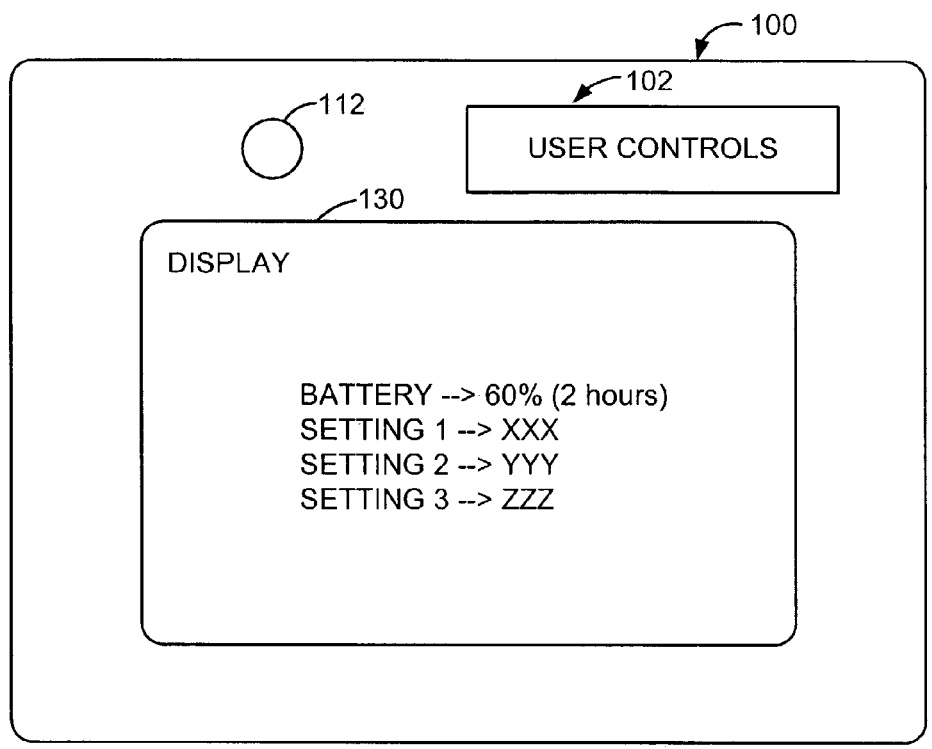
FIG. 1 is an embodiment illustrating certain physical components of a digital camera, including a status button, which may be activated to prompt the display of parameters while the camera is in a power-off state.

Reference is made to FIG. 1, which illustrates an exemplary embodiment of the invention, as implemented in a digital camera 100. The camera 100 is represented diagrammatically, and it should be appreciated that many features and controls are omitted for purposes of simplifying the illustration of certain features of the invention. In one embodiment, the camera 100 may include a variety of user controls 102, which allow the user to control various operational and other aspects of the camera 100. In accordance with one embodiment, a status button 112 is provided. By depressing this status button 112, the camera 100 may display to a user various parameters of the device. In this regard, the camera 100 includes a display 130 for displaying information to a user. Consistent with the invention, the display 130 may be any of a variety of types of displays, such as a liquid crystal display (LCD), a plasma display, an organic light emitting diode (OLED) display, etc.

As is known, when the camera 100 is in a conventional power-off state, the display 130 is powered off as well. Accordingly, information is not displayed to the user, when the camera is in a conventional power-off state. However, and as will be described further herein, in response to the activation of the status button 112, operating power is applied to the display 130 and a limited set of other operational components, to enable the display of various operational parameters. One such parameter is the remaining or existing battery life of the battery used to power the camera 100. Consistent with the invention, this battery life, or battery-power status, may be displayed in a variety of formats, including a percentage (e.g., 60%) of the battery life or charge, or alternatively by displaying an approximation of the amount of usable time remaining on the battery. In this regard, the approximation of the amount of usable time remaining on the battery may be presented either numerically or graphically. Of course, if the battery-power status is displayed in terms of time remaining on the battery, any such characterization would necessarily be an approximation, as the battery life will vary depending upon the usage. For example, a camera having a motor-driven auto-focus lens will consume more power during times of lens focusing, than at other times. Similarly, a variety of other operations may impose a larger power consumption than other operations.

One aspect of this method relates to the determination of the amount of power or life remaining in the connected battery. As will be described in further detail below, consistent with the invention, there are a variety of ways in which this determination may be made. Broadly, the various methodologies for making this determination include: (1) storing a measured battery-power status (or power level) at a time substantially commensurate with a power-off condition (i.e., when the camera is powered down); (2) retrieving this value in response to the activation of the status button 112; (3) approximating an amount of power decay that has occurred while the camera 100 has been powered down; and (4) subtracting the approximated power decay from the saved power level. As will be further appreciated from the additional discussion provided herein, various alternatives and/or additional steps may be performed in connection with the determination of the current battery-power status.

Figure 2:
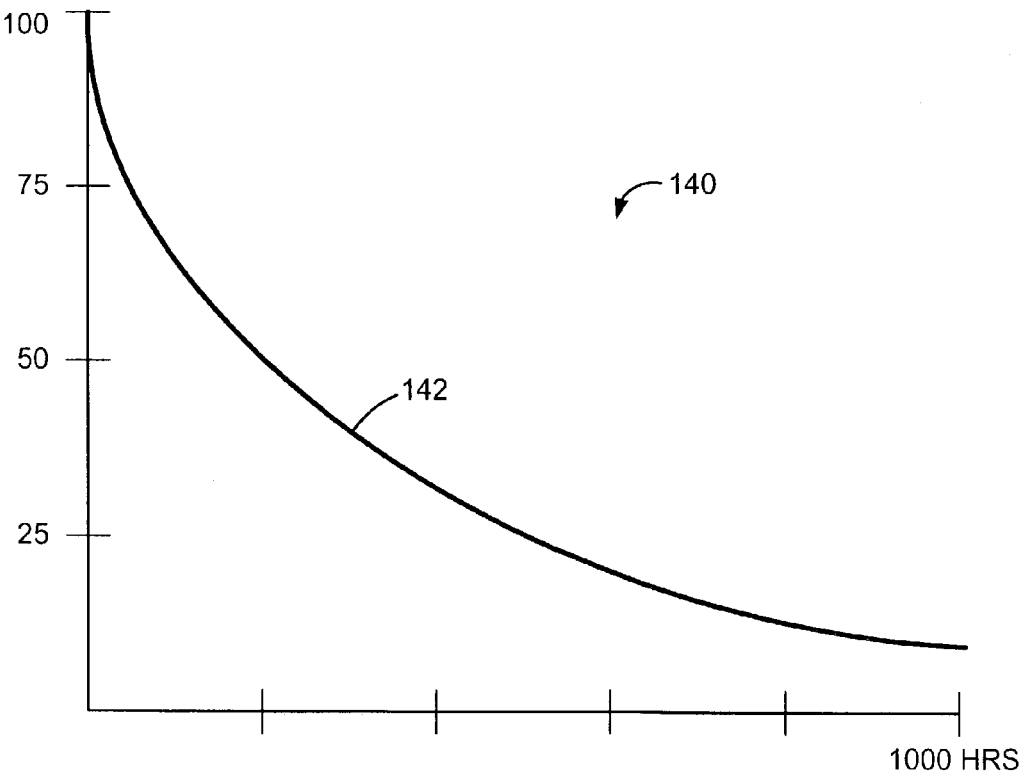
FIG. 2 is a diagram of a curve of an exemplary decay function of battery power over time.

As mentioned above, in accordance with one embodiment of the invention, an approximation is made as to the amount of power or energy within the battery that has decayed over a time period since the last measured (and stored) battery-power status event. It will be appreciated that this battery-power decay is dependent upon the type of battery as well as the type of camera 100 (or other device) that the battery is connected to. In this regard, the battery decay is a function of both the natural decay rate of the battery and the power consumption of the camera when in the power-off state. The relationship between the passage of time and the percentage of battery life remaining in the battery may be an exponential function, similar to that illustrated in the diagram of FIG. 2. In this regard, FIG. 2 is a diagram 140 showing a curve 142 of an exemplary decay function of a particular model battery connected to a particular device. Such a decay function may be computed or expressed by an equation, or may be derived through experimentation and measured empirical data. If derived through empirical data, the data points defining the curve 142 may be stored in a look-up table or other memory area within the camera 100 (or other device). If the curve 142 is defined through a mathematical formula, then the formula may be stored in memory for retrieval and later computation. As is observed from the curve in FIG. 2, as time passes, the energy level of the battery approaches zero. If, for example, one hundred hours have passed since the battery status was last measured (and the camera has been in a power off state throughout that time duration), the amount of energy remaining in the battery would depend upon the amount of energy that was last measured in the battery.

Figure 3:
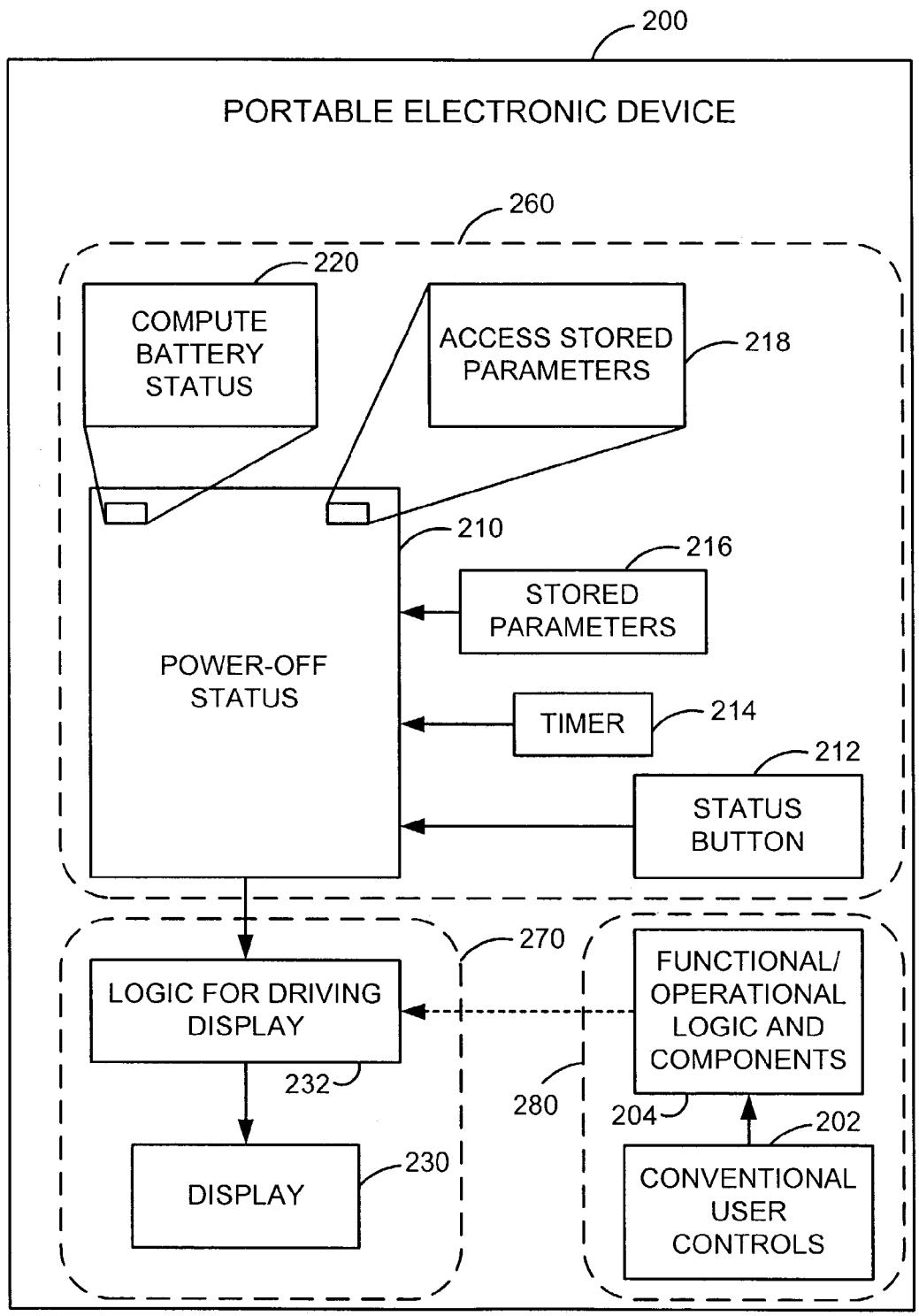
FIG. 3 is a block diagram of certain components of a portable electronic device constructed in accordance with one embodiment of the invention.

Reference is now made to FIG. 3, which is a block diagram illustrating certain components in an exemplary embodiment of a portable electronic device 200 constructed in accordance with one embodiment of the present invention. As noted in connection with the camera 100 of FIG. 1, a portable electronic device 200 constructed in accordance with an embodiment of the invention generally includes user controls 202 to accommodate a variety of manual input from a user. The device 200 may also include a variety of functional or operational logic and components 204. Depending on the particular device 200, these components may include a variety of operational components, such as circuits, logic, motor(s), etc. The device 200 also includes a display 230 and associated logic 232 for driving the display 230.

In addition to the foregoing conventional components, the device 200 also includes other components that are utilized in connection with various embodiments of the present invention. One such component 210 comprises logic or circuitry for computing the power-off status of the battery. As illustrated in FIG. 3, a status button 212 is provided to allow a user to instruct the device 200 to compute and display various parameters, including the current status of the battery. As previously mentioned, a battery-power status will have been previously computed during a power-on state and stored for later retrieval. There are a variety of devices that are well known for measuring the power or energy level remaining in a battery, and therefore this process need not be described herein. Generally, the process is one in which the battery power is determined through measurements taken under load. Thus, in the example of a digital camera, the heaviest load is applied to the battery typically when a motor is being driven, for example, to adjust the zoom or focus of an optical lens assembly. In known devices, if a user wishes to ascertain the current status of a battery (when the device is powered off), the user is generally required to power-on the device and allow the device to cycle through its power-on processes, which often include advancing a lens assembly or otherwise applying a load to the battery, in order to obtain a battery-power measurement. Not only does this require an undesirable amount of time, but also further deteriorates the remaining life of the battery.

Accordingly, the present invention overcomes these and other undesirable features by storing a measured battery-power status during normal (prior) operation of the device 200 and storing that measured value in memory. This and other parameters are stored in memory 216. In accordance with an embodiment, the device 200 also stores a time stamp or other value indicative of the time in which the battery-power status was measured and stored. In one embodiment, this value may be measured in connection with a power-off sequence of the device 200. That is, in response to a user turning off a power switch of the device 200, the device may measure the battery status and save that status. This way, the stored value reflects the battery status at the time of entering the power-off condition.

Also illustrated in FIG. 3 are components to access the stored parameters 218 and compute the battery status 220. More detail with regard to the computation of the battery status will be discussed in connection with FIG. 4.

Before discussing FIG. 4, however, additional detail regarding an embodiment of the present invention will first be described. In this regard, FIG. 3 illustrates certain groupings of components. For example, a first group 260 includes components that are associated with various features of embodiments of the present invention. Another group 270 includes the circuitry and logic of the display 230 and the logic for driving the display 232. A third group of components 280 includes the user controls 202, and various functional and operational logic and components 204. As previously discussed, the present invention is directed to a novel method and apparatus for providing a display to a user of certain parameters of a device while powered off. As is known with portable electronic devices, even when powered off, certain components within a device will continue to draw a very small amount of power. For example, if the device includes a timer or time-of-day circuit, power is maintained to this circuit so that time and date information may be preserved. Likewise, the memory components used to store certain configuration settings, operational status, or other information may also remain powered to maintain the stored values.

However, the power draw on these and other devices that remain operational during a power-off condition is extremely small, and therefore do not significantly shorten the life expectancy of the battery. Other components, however, such as those designated in the second and third groups 270 and 280 draw little to no power when the device 200 is in a power-off state. Of course, in order to carry out the functional operation of the present invention, as described herein, the devices in the second group 270, including the display 230 and logic 232 for driving the display, must be powered up in order to operate, even during the power-off condition. However, other functional and operational components within a device 200 remain powered-off during the display of the parameters that are displayed in response to the activation of the status button 212. In one embodiment, power may be applied to the components 270 for a specified or predetermined time period (e.g., 3 seconds), in response to the activation of the status button 212. Alternatively, the power may be applied to these components 270 for the duration that the status button 212 is activated (e.g., as long as the button is depressed).

Thus, consistent with the foregoing discussion and in accordance with one embodiment of the invention, a portable electronic device 200 may be provided or equipped with a status button 212 that allows a user to depress (or activate) the status button 212 during a time period in which the device 200 is otherwise powered off. In response to the status button, the device 200 operates to retrieve stored parameters (such as configuration or operational parameters of the device 200) and/or to compute the current energy or power level remaining on the battery, and display that information to a user over a display 230 that is provided within the device 200. In one embodiment, certain operational components remain powered off during this status-display sequence, thereby minimizing any additional power draw to the battery. In addition, and in accordance with the methodology described herein, the battery-power status and/or other parameters are quickly displayed to the user, without requiring the time ordinarily consumed through a power-on cycling period of the device 200.

As previously mentioned, one embodiment of the present invention provides a novel method or approach of quickly approximating the amount of power or energy remaining in a battery that is coupled to a portable electronic device. This computation was broadly designated by logic component 220 of FIG. 3.

Figure 4:
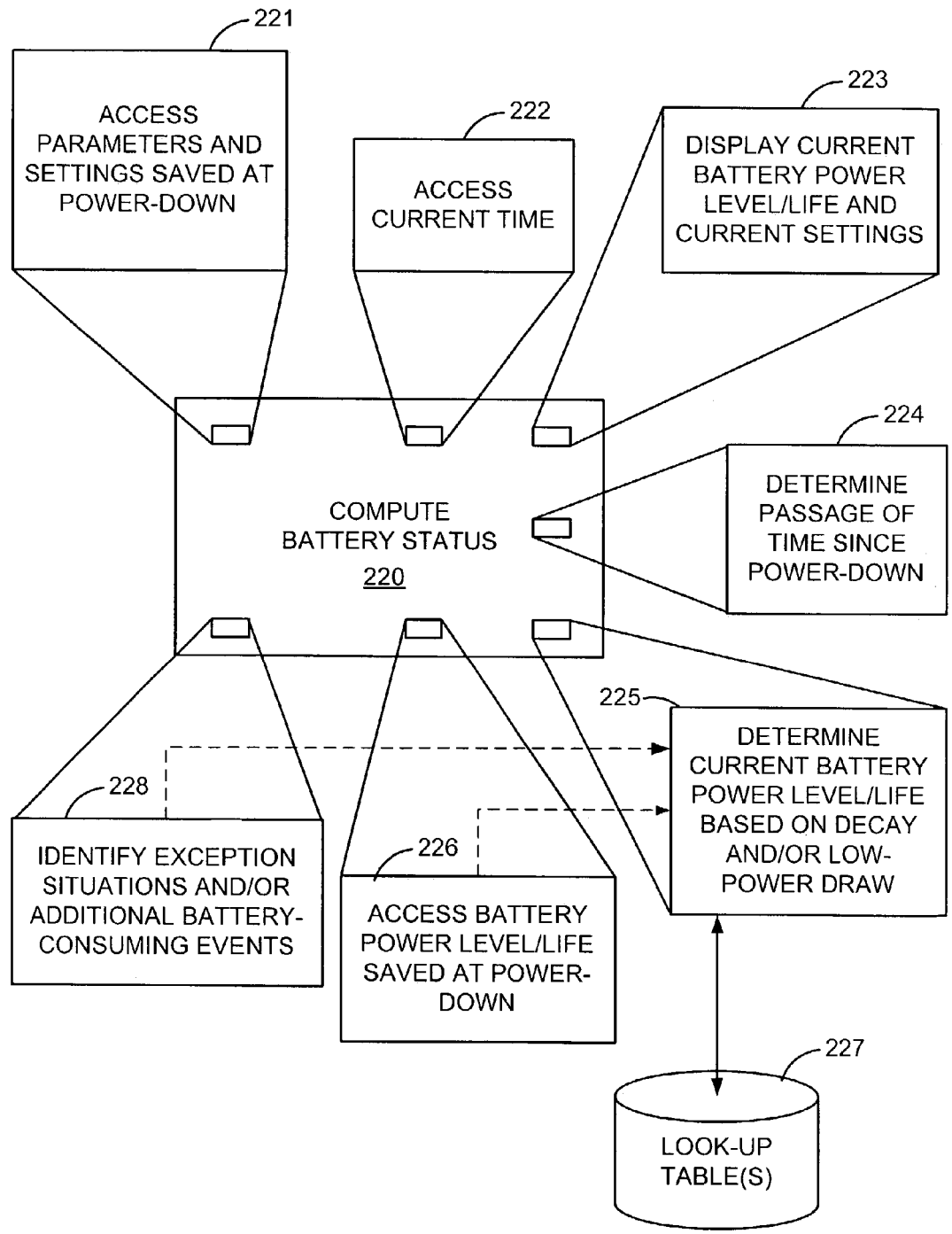
FIG. 4 is a block diagram of certain components of a portable electronic device constructed in accordance with one embodiment of the invention.

Reference is now made to FIG. 4, which is a block diagram illustrating more detail with regard to the implementation of this logic component 220, in accordance with certain embodiments of the present invention. As illustrated in FIG. 4, the apparatus for computing the battery status 220 includes logic for accessing parameters and settings saved during normal operation of the device 200, and preferably at or immediately prior to a power-down event or sequence. In one embodiment, the previously saved parameters may include a measured battery power or energy level, a time stamp, as well as a variety of operational or configuration settings, which may vary widely from device to device. The apparatus 220 also includes logic 222 for accessing or determining the current time (e.g., a time-of-day circuit). Logic 223 may also be provided for displaying the current battery-power level or remaining life expectancy of the battery, as well as other parameters. As previously mentioned, this logic component 223 may include the circuitry or logic necessary to apply power to the display and other components, in a limited fashion, during a power-off state of the device.

Another component 224 includes logic for determining the passage of time since the power-down event, or since the event at which the parameters were previously stored. It should be appreciated that this element may be implemented in different ways. If, for example, the time stamp saved when the parameters were previously stored is a time stamp from a time-of-day clock, then the passage of time may be determined by simply subtracting that time stamp from a corresponding time stamp of the current time-of-day. Alternatively, a timer may simply be reset at the time that parameters are measured or stored, and that timer is allowed to increment or run thereafter (during the power-off state), such that the passage of time may be determined by measuring or reading the value of that timer.

Logic 225 may also be provided for determining the current battery power level, or remaining battery life, based on a previously-saved power level and an approximation of the decay that has occurred over the period of time determined by logic 224. As previously mentioned, this decay includes both the natural decay of the battery, as well as decay from the power draw of the device when in the power-off state. In addition, the logic 225 may factor into the computation other intervening events that may impact the current battery-power level. As just one example, each time a user depresses the status button 212, and the device applies power to the display in order to display the parameters, an additional draw is placed on the battery. In one embodiment, events such as this may be logged and factored into the battery-power status computation.

In conjunction with the logic 245 for determining the current battery-power status, the apparatus 220 may include a component 226 for accessing the battery-power status or life expectancy that was previously saved (preferably at or near a power-down condition). One or more look-up tables 227 may be provided in memory for carrying out this computation, particularly in embodiments that estimate or approximate the battery decay using empirical data. In other embodiments, equations may be saved in memory (or look-up tables) that define a power-decay functional curve (such as that illustrated in FIG. 2). A current battery-power level may be determined principally by using the previously-stored battery-power level and the determined passage of time (since the measurement of the previously-stored battery-power level). In certain embodiments, the logic 225 may also operate in conjunction with logic 228 that identifies and measures additional battery-consuming events.

It should be appreciated that, in accordance with one embodiment of the invention, the apparatus determines (without additional measuring) a current status level of the battery that is connected to the device. This determination is made principally by retrieving a previously-measured and stored battery-power level and subtracting from that level an amount of usage or decay that has occurred since the measurement was taken or stored. In accordance with this broad feature, a variety of different and specific alternatives may be implemented for carrying out this broad aspect.

Figure 5:
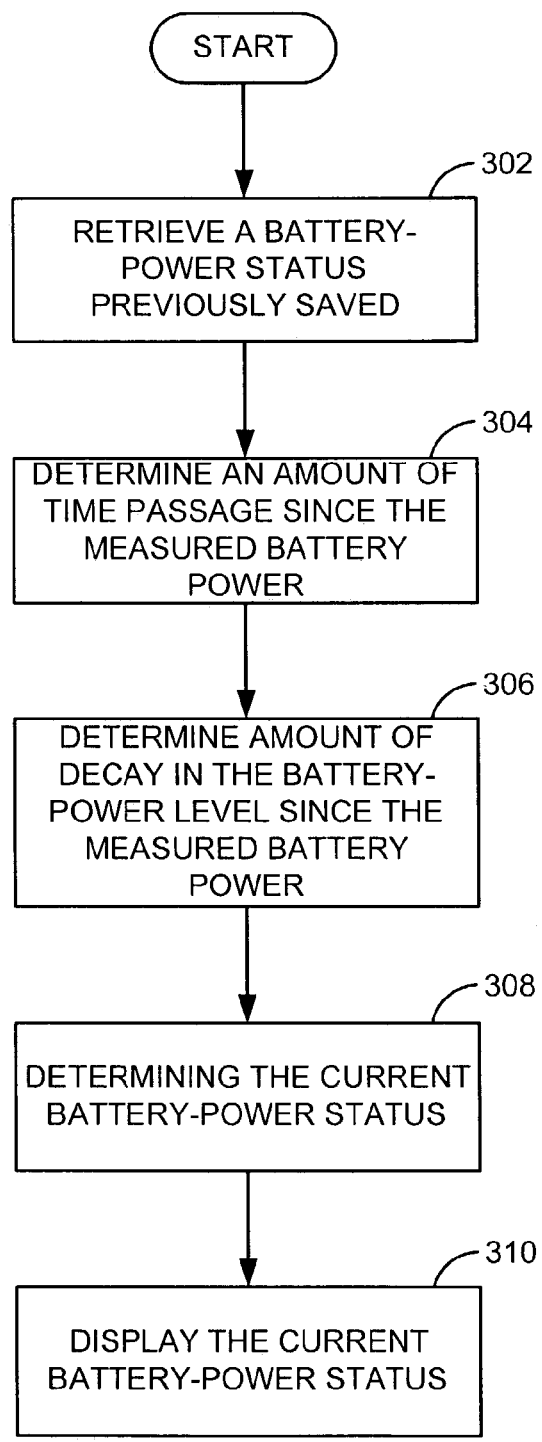
FIG. 5 is a flowchart showing the top-level functional operation of one embodiment of the invention.

Reference is now made to FIG. 5, which is a flowchart illustrating the top-level functional operations of one embodiment of the invention. As previously described, one embodiment of the present invention is directed to a unique methodology for computing a current battery-power level for a battery that is connected to a portable electronic device. In accordance with an embodiment of this invention, the method is carried out by retrieving a battery-power status previously saved (step 302). The method also determines an amount of time passage since the battery power was measured and stored (step 304). Preferably, the measurement and storage of the battery power will occur at or substantially commensurate with a power-down condition of the device. The method then determines an amount of decay in the battery-power level since the battery power was measured (step 306). The method uses this decay determination in computing a current battery-power status (step 308). As previously mentioned, other factors may be included in the step 308 for determining the current battery-power status, including additional power-draw events that have occurred since the previous battery-power measurement. One such event could be the determination and display of the battery power in a power-off state. Another such event may comprise normal (power-on) operation that occurs after the battery-power measurement and storage. Finally, the method displays the determined current battery-power status to the user (step 310).

Figure 6:
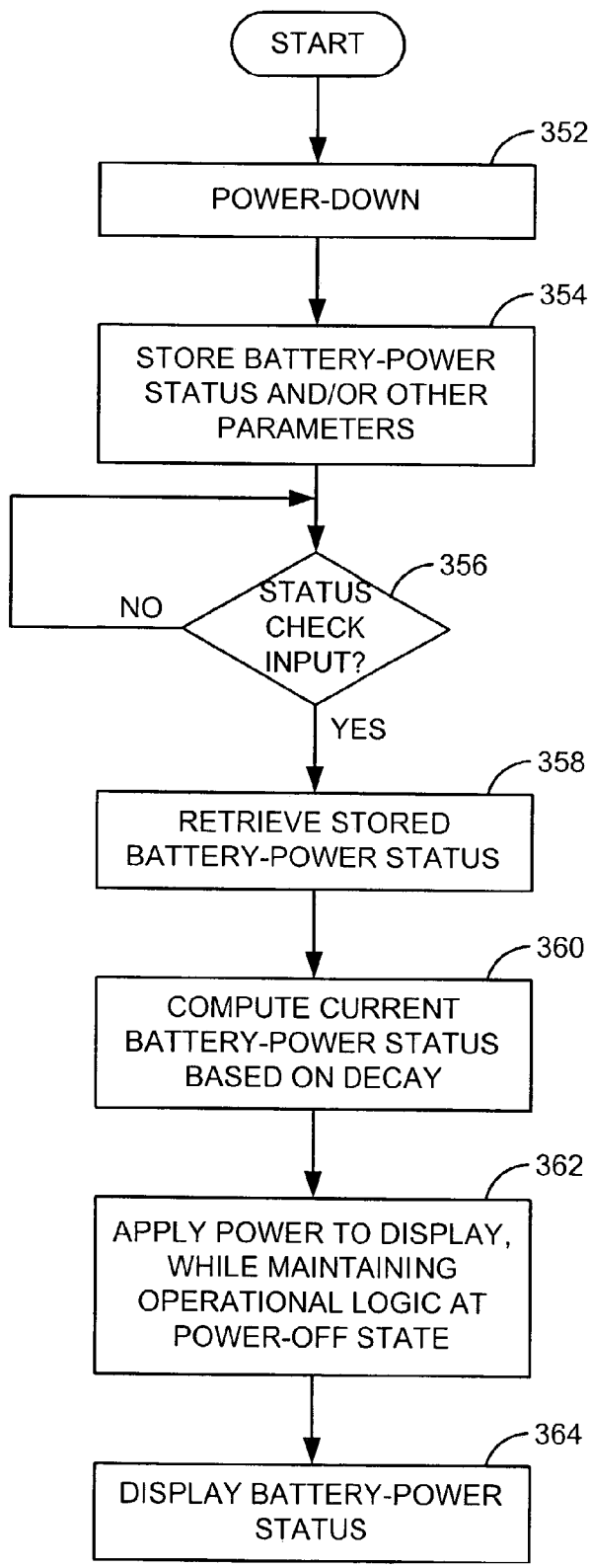
FIG. 6 is a flowchart showing the top-level functional operation of one embodiment of the invention.

Reference is now made to FIG. 6, which is a flowchart illustrating the top-level operation of another embodiment of the present invention. As previously mentioned, during normal (power-on) operation, the power level of the battery for the portable device is periodically computed and stored. In one embodiment, this computation is performed in response to a signaling condition to power-off the device. That is, upon detecting that a user has turned the power to the device off, and before removing power from the operational components, the device measures and stores the current battery-power level. Thus, in accordance with this embodiment, a method detects an instruction for the device to power down (step 352). In response thereto, the method stores the battery-power status and/or other parameters (step 354). In connection with this step, method may store the last computed battery-power level or alternatively may perform an appropriate computation to determine the current battery-power level. Thereafter, the method essentially does nothing while the device is in a power-off state, except wait for activation of a status check input (step 356). Upon request by the user to perform a status check, the method retrieves the stored battery-power status (step 358) and computes the current battery-power status, based in-part on decay that has occurred since the previously-measured battery-power status was stored (step 360). Thereafter, the method applies power to the display, while maintaining other operational logic of the device in a power-off state (step 362) and displays the current battery-power status on the display (step 364). Of course, consistent with the scope and spirit of the invention, other device parameters may be displayed as well, in response to the activation of the status check input.

What is claimed is:

1. A method for displaying a current battery-power status of a portable electronic device in a power-off state comprising:
    retrieving a previously measured and saved battery-power status;
    determining an approximation of time passage since the retrieved battery-power status was measured or saved, wherein determining the approximation of time passage comprises retrieving a current time value and comparing it to a time value at a time substantially commensurate with when a power-off condition occurred;
    determining an amount of decay in the battery power level since the power-off condition, the amount of decay being dependent on the determined approximation of time passage;
    determining the current battery-power status, the current battery-power status being dependent on the retrieved battery-power status and the determined decay; and
    displaying the current battery-power status.

2. The method of claim 1, wherein determining an amount of decay comprises computing the amount of decay through a mathematical equation.

3. The method of claim 2, wherein the computing the amount of decay comprises computing the amount of decay using both the retrieved battery-power status and the approximation of time passage in the computation.

4. The method of claim 1, wherein the displaying the current battery-power status comprises applying power to a display and certain display control logic, while maintaining other operating logic components of the portable electronic device in a power-off state.

5. The method of claim 1, wherein the determining the current battery-power status comprises subtracting the determined decay from the retrieved battery-power status.

6. The method of claim 5, wherein determining the current battery-power status further comprises approximating battery power reductions resulting from additional battery-consuming events that have occurred since a power-off condition.

7. The method of claim 5, wherein determining the current battery-power status further comprises subtracting the approximated battery power reductions from the retrieved power status.

8. The method of claim 1, wherein displaying the current battery-power status comprises displaying the determined battery-power status for a predetermined amount of time, in response to an activation of a battery-power status input.

9. The method of claim 1, wherein displaying the current battery-power status comprises displaying the determined battery-power status in response to an activation of a battery-power status input, wherein the battery-power status is displayed for a duration substantially equal to an amount of time that a battery-power status input is activated.

10. The method of claim 1, wherein determining an amount of decay, and determining the current battery-power status each involve approximations.

11. A method for displaying a current battery-power status of a portable electronic device in a power-off state comprising:

retrieving a previously measured and saved battery-power status;

determining an approximation of time passage since the retrieved battery-power status was measured or saved;

determining an amount of decay in the battery power level since the power-off condition, the amount of decay being dependent on the determined approximation of time passage;

determining the current battery-power status, the current battery-power status being dependent on the retrieved battery-power status and the determined decay; and displaying the current battery-power status; and wherein determining an amount of decay comprises obtaining decay information from a battery-dependent look-up table.

12. The method of claim 11, wherein determining an amount of decay further comprises using both the retrieved battery-power status and the approximation of time passage to obtain decay information from an appropriate location of the battery-dependent look-up table.

13. The method of claim 11, wherein determining an amount of decay includes both a determination of natural battery decay and a determination of decay resulting from a power draw from the portable electronic device when in a power-off state.

* * * * *